73-632

OR 3,585,865

United States Patent [11] 3,585,865

| [72] | Inventors | Josef Bungart<br>Wesseling, near Cologne,<br>Walter Herzfeld, Knapsack, near Cologne,<br>both of Germany |
|---|---|---|
| [21] | Appl. No. | 784,566 |
| [22] | Filed | Dec. 18, 1968 |
| [45] | Patented | June 22, 1971 |
| [73] | Assignee | Knapsack Aktiengesellschaft<br>Knapsack, near Cologne, Germany |
| [32] | Priority | Dec. 23, 1967 |
| [33] | | Germany |
| [31] | | P 16 48 565.7 |

[54] APPARATUS FOR THE ULTRASONIC TESTING OF METAL WALLS
6 Claims, 4 Drawing Figs.

[52] U.S. Cl. ................................................. 73/71.5, 73/67.5
[51] Int. Cl. .................................................. G01n 24/00

[50] Field of Search .......................................... 73/71.5, 67.5, 67.6, 67.7, 67.8; 148/12.9

[56] References Cited
UNITED STATES PATENTS

| 3,171,047 | 2/1965 | Bergman et al. | 310/8.7 |
| 3,242,723 | 3/1966 | Evans | 73/71.5 |
| 3,303,691 | 2/1967 | Beaward et al. | 73/71.5 |
| 3,315,520 | 4/1967 | Carnevale et al. | 73/71.5 |

Primary Examiner—Richard C. Queisser
Assistant Examiner—Arthur E. Korkosz
Attorney—Connolly and Hutz ABSTRACT: Hot metal walls are subjected to ultrasonic testing by means of a supersonic probe which is arranged so as to be cooled by means of a cold stream coming from a Hilsch tube.

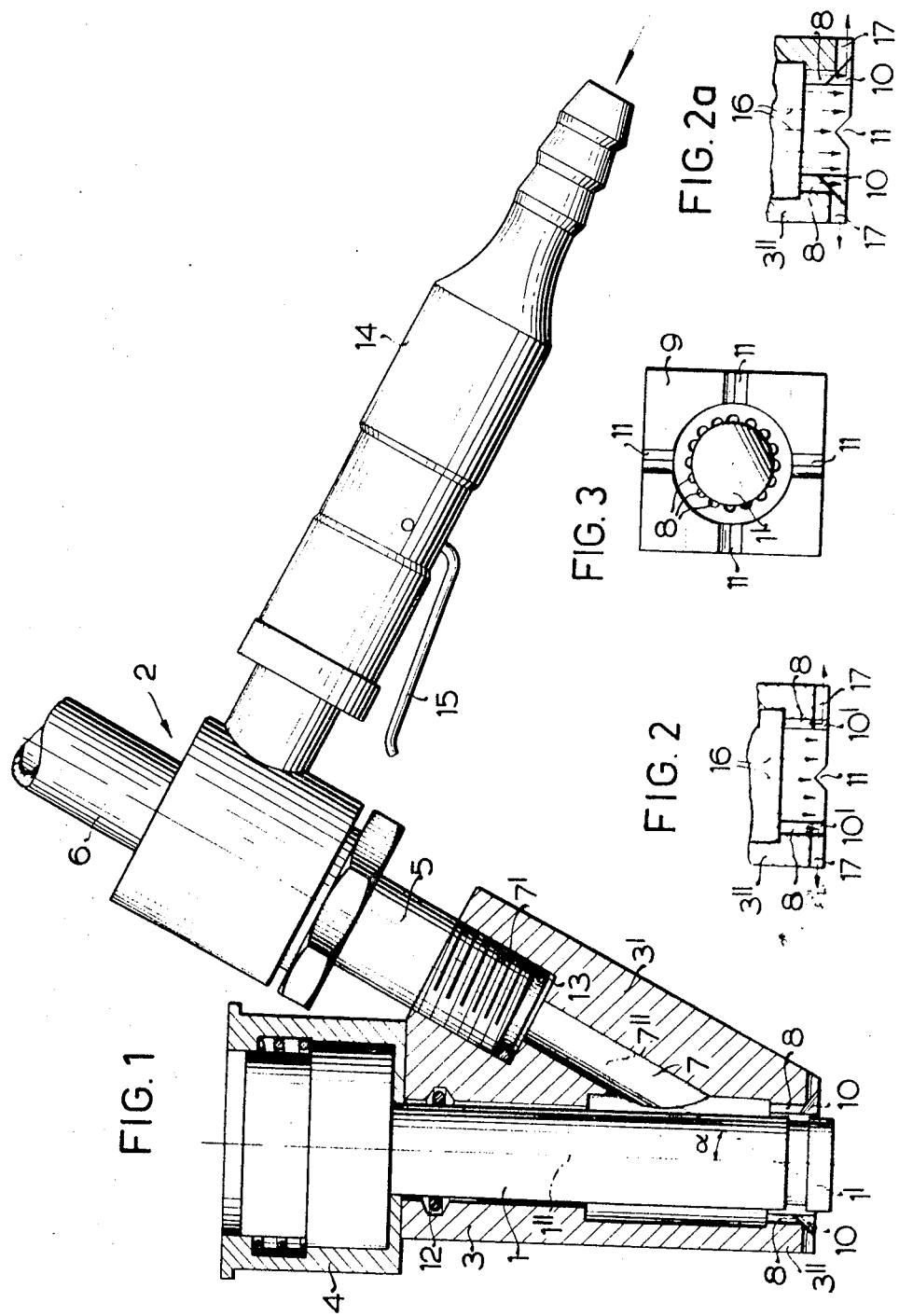

APPARATUS FOR THE ULTRASONIC TESTING OF METAL WALLS

The present invention relates to a metal wall ultrasonic testing apparatus by means of a supersonic probe.

In an earlier process the ultrasonic probe is placed on and arranged level with the metal wall to be tested, and the metal wall is subjected to acoustic irradiation by means of ultrasonic waves emitted by a sound generator crystal, the ultrasonic waves themselves and their echo waves being registered in a receiver set. The time delay between the registration of the ultrasonic waves emitted by the sound generator and that of their echo waves enables conclusions to be drawn as to thickness of the tested metal wall and as to defects in the wall, including cavities or lamination, for example. The plastic delay line, made up of an amorphous material, for example plexiglass, is required to have a substantially constant temperature gradient to obviate falsification of the measured values, which can be occasioned by expansion or shrinkage of the plastic delay line under the action of heat.

As can be inferred from this, acoustic irradiation has been limited heretofore to metal walls having a maximum temperature of 80°C. In other words, the process reported above is merely applicable to the ultrasonic testing of metal walls having a temperature of up to about 80°C., but it is not applicable to walls having a temperature higher than 80°C. Needless to say it is highly desirable to have a process permitting acoustic irradiation of relatively very hot metal walls, for example the walls of continuously operated furnaces. These include substantially all industrial furnaces, e.g. electrothermal ferrosilicon, calcium carbide or phosphorous-production furnaces.

It is the object of the present invention to provide a ultrasonic testing apparatus which obviates the disadvantageous phenomena reported above and yet enables very hot walls to be readily tested by acoustic irradiation. This is substantially achieved by the present invention which enables hot walls to be subjected to ultrasonic testing by means of a ultrasonic probe which is arranged to be cooled by a stream of cold material issuing through a Hilsch tube and uniformly encircling the free end of the ultrasonic probe. To this effect, the wall zone to be tested should advantageously receive a layer of a temperature-resistant contact agent, for sound transmission. The contact agents useful for this include more especially silicon fats, graphite pastes and similar materials. These are the steps necessary to obtain a fully satisfactory metal wall ultrasonic testing process. Experiments have shown that metal walls having a temperature of up to 500° C. are readily accessible to reliable acoustic irradiation, without any difficulty. The test results obtained were found to be reliable and accurate.

The invention provides an apparatus for carrying out the above process, wherein a ultrasonic probe, which is mounted in a guide casing so as to be axially displaceable therein, and arranged so as to project into a spring housing receiving a sound generator, is disposed so as to communicate through a gas flow line with a cold stream outlet pipe of a Hilsch tube. The guide casing preferably has an inclined cantilever which is formed with a bore. The bore runs to the ultrasonic probe and its free end is designed as a member receiving the cold stream outlet pipe coming from the Hilsch tube. The axis of the bore and the axis of the ultrasonic probe should preferably include an angle of substantially 25°. While the shape of the receiving member is not critical, it should preferably be a screw or plug connection.

The metal wall ultrasonic testing apparatus so designed has a ultrasonic probe which even under extremely unfavorable conditions will be found to have an always constant temperature gradient, given constant temperature of the sound generator and the echo receiver set. This is more particularly occasioned by the steam of cold material which issues through the cold stream outlet of the Hilsch tube and subjects the ultrasonic probe to intense cooling. Satisfactory turbulent flow around the free end of the probe is ensured by the 25° contact angle, included by the cantilever bore axis and the axis of the ultrasonic probe.

In accordance with a further feature of the present invention, it is a further important requirement for the correct cooling of the probe that the inside of the guide casing be formed at its free end with regularly arranged peripheral flow grooves. These are disposed so as to project into an annular distributor duct recessed in the ultrasonic probe front surface, which in turn has radial flow grooves extending outwardly from the distributor duct.

For the pressure connection pipe, which runs to the Hilsch tube it is advantageous to be hand-operated and to have a valve accessible from the outside, to facilitate manipulation of the apparatus.

A Hilsch tube is an energy separator comprising three tubes. These are joined together to form a T. One of these tubes serves as a pressure connection line, a further tube as a cooling medium supply line and the third tube as a heat supply line. The supply of the pressure connection pipe with gas maintained under a pressure substantially of 6 atmosphere gauge is found to be accompanied by energy separation, which occurs at the junction area of the three tubes. Hot gas with a temperature of substantially 80° C. is then delivered through the heat supply line, and cold gas with a temperature of substantially −16° C. is delivered through the cooling medium supply line. In the ultrasonic testing apparatus of the present invention, the cold gas coming from the cooling medium supply line of the Hilsch tube is used for the purpose of cooling the ultrasonic probe. A working pressure of 6 atmospheres gauge for the Hilsch tube has been found to produce satisfactory results. It has also been found that departures from the above 6 atmosphere gauge pressure impair the tube efficiency immaterially only. This means in other words that satisfactory results can also be obtained under a working pressure different from the above 6 atmosphere gauge pressure.

An exemplary embodiment of the present invention is illustrated in the accompanying drawing, wherein FIG. 1 is a side elevational view of the ultrasonic testing apparatus of the present invention, FIG. 2 is a side-elevational view of the free end of the guide casing having a rectangular annular configuration slightly different from that shown in FIG. 1.

FIG. 2a is another side elevational view of the free end of the guide casing having the annular configuration shown in FIG. 1, FIG. 3 shows the front surface of the ultrasonic probe.

The apparatus shown diagrammatically in the accompanying drawing is used for carrying out the metal wall ultrasonic testing process by means of a ultrasonic probe 1. The probe is arranged to be cooled by a cooling medium which is made to issue through a Hilsch tube 2 so as to uniformly encircle the free end 1' of probe 1. The wall zone to be tested is provided with a layer of a temperature-resistant contact agent, for example a silicon fat, graphite paste or similar material. The ultrasonic probe 1, which is mounted in a guide casing 3 so as to be axially displaceable therein and arranged so as to project into a spring housing 4 receiving a sound generator, is disposed so as to communicate through a gas flow line with the cooling medium outlet 5 of the Hilsch tube. Heat supply line 6 disposed opposite with respect to pipe 5 is free and blows warm air of substantially 80° C. to some place or other, during the ultrasonic testing operation. The guide casing 3 has an inclined cantilever 3' which is formed with bore 7. The bore 7 runs to the ultrasonic probe 1 and its free end is designed as a receiving member 7' for the cooling medium outlet pipe 5 of the Hilsch tube 2. The bore axis 7" and the axis of the ultrasonic probe 1" include an angle of substantially 25°. The receiving member, which can be shaped as desired, is preferably a screw or plug connection.

The inside of guide casing 3 is formed at its free end 3" with regularly arranged, peripheral flow grooves 8, which are disposed so as to project into an annular distributor duct 10 recessed in the front surface 9 of the ultrasonic probe. The duct 10 can have a rectangular cross-sectional area (reference numeral 10' in FIG. 2) or a triangular cross-sectional area (reference numeral 10 in FIG. 2a) and can be recessed in the free end 3" of guide casing 3. The front surface 9 of the ultrasonic probe is formed with radial flow grooves 8 extended outwardly, from distributor duct 10 or 10'.

Pressure flow return is obviated by means of packing 12, sealing probe 1 with respect to guide casing 3, and by means of packing 13, sealing cooling medium supply line 5 with respect to receiving member 7'. Pressure connection shortpipe 14, which runs to the Hilsch tube 2, is a control knob for the operating personnel and has a valve which can be actuated from the outside by means of lever 15.

The cold stream flow is diagrammatically shown by arrows 16 in FIG. 2 which also shows the reversal of flow steams 16 in flow streams 17.

We claim:

1. A device for the ultrasonic testing of hot metal walls comprising a casing having a contact end and a longitudinal passageway communicating with said contact end, an ultrasonic transducer, said transducer being mounted in said longitudinal passageway in operative communication with said contact end of said casing, said casing having a transverse passageway intersecting said longitudinal passageway, a Hilsch tube having hot and cold outlet tubes, said Hilsch tube being mounted on said casing with its cold outlet tube connected to said transverse passageway for discharging cold fluid thereto, the hot outlet tube of said Hilsch tube being disposed to discharge away from said casing, and said Hilsch tube also having a pressure supply tube for connection to a source of pressurized fluid whereby a flow of cold fluid is discharged from said Hilsch tube through said transverse passageway and against said ultrasonic transducer to prevent it from becoming overheated when in contact with said hot metal walls.

2. A device as set forth in claim 1 wherein said transverse passageway intersects said longitudinal passageway at an angle of approximately 25°.

3. A device as set forth in claim 1 wherein said longitudinal passageway has an enlarged chamber where it is intersected by said transverse passageway and about said transducer, said longitudinal passageway extending through said contact end of said casing to provide an opening in said contact end of said casing, the end of said transducer being disposed in said opening to form an annular opening therein, a series of longitudinal connecting passageways peripherally disposed in said casing about said transducer between said annular chamber and said annular opening whereby cold fluid is conducted from said annular chamber to said annular passageway and to said contact end of said casing and to the end of said transducer.

4. A device as set forth in claim 3 wherein said contact end of said casing has radial grooves extending from said annular opening to the periphery of said contact end for conducting cold fluid across said contact end of said casing.

5. A device as set forth in claim 1 wherein said pressurized supply tube of said Hilsch tube comprises valve means said valve means includes operating means whereby said flow of fluid to said Hilsch tube is controlled, and said valve means extends at an angle to said casing for convenient grasping and manipulation of said device.

6. A device as set forth in claim 1 wherein slide means mounts said transducer in said longitudinal passageway for permitting movement of said transducer longitudinally relative to said casing, and resilient means reacts between said transducer and said casing for urging said transducer in resilient contact with said hot walls.